(12) United States Patent
Kondiles et al.

(10) Patent No.: US 11,995,057 B2
(45) Date of Patent: *May 28, 2024

(54) EFFICIENT DATABASE MANAGEMENT SYSTEM AND METHOD FOR USE THEREWITH

(71) Applicant: Ocient Inc., Chicago, IL (US)

(72) Inventors: George Kondiles, Chicago, IL (US); Rhett Colin Starr, Long Grove, IL (US); Joseph Jablonski, Chicago, IL (US); S. Christopher Gladwin, Chicago, IL (US)

(73) Assignee: Ocient Inc., Chicago, IL (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/652,266

(22) Filed: Feb. 23, 2022

(65) Prior Publication Data

US 2022/0300472 A1 Sep. 22, 2022

Related U.S. Application Data

(63) Continuation of application No. 16/928,509, filed on Jul. 14, 2020, now Pat. No. 11,294,872, which is a
(Continued)

(51) Int. Cl.
*G06F 16/22* (2019.01)
*G06F 16/23* (2019.01)
(Continued)

(52) U.S. Cl.
CPC ........ *G06F 16/221* (2019.01); *G06F 16/2365* (2019.01); *G06F 16/24578* (2019.01);
(Continued)

(58) Field of Classification Search
CPC ............ G06F 16/24578; G06F 16/254; G06F 11/008; G06F 16/215; G06F 11/3452; G06F 3/0482; G06F 17/18
See application file for complete search history.

(56) References Cited

U.S. PATENT DOCUMENTS 5,548,770 A 8/1996 Bridges
5,634,011 A 5/1997 Auerbach et al.
(Continued)

OTHER PUBLICATIONS

A new high performance fabric for HPC, Michael Feldman, May 2016, Intersect360 Research.
(Continued)

*Primary Examiner* — Hau H Hoang
(74) *Attorney, Agent, or Firm* — Garlick & Markison; Bruce Stuckman; Timothy D. Taylor

(57) ABSTRACT

A method for execution by a computer of a database management system includes obtaining a dataset that includes a set of data records, where the data set is associated with a set of data characteristics. The method further includes ranking analytical calculations of a list of analytical calculations that are able to be executed on the dataset based on the set of data characteristics and a set of analytical calculation characteristics associated with the list of analytical calculations to produce a ranked list of analytical calculations. The method further includes selecting an analytical calculation from the ranked list of analytical calculations based on the ranking. The method further includes executing the selected analytical calculation on the dataset to produce an analytical calculation result.

20 Claims, 10 Drawing Sheets

Related U.S. Application Data continuation of application No. 15/840,558, filed on Dec. 13, 2017, now Pat. No. 10,747,738.

(60) Provisional application No. 62/433,901, filed on Dec. 14, 2016.

(51) Int. Cl.
 G06F 16/2457 (2019.01)
 G06F 16/25 (2019.01)
 G06F 16/28 (2019.01)
 G06F 17/10 (2006.01)

(52) U.S. Cl.
 CPC ............ G06F 16/25 (2019.01); G06F 16/285 (2019.01); G06F 17/10 (2013.01)

(56) References Cited

U.S. PATENT DOCUMENTS

| | | | |
|---|---|---|---|
| 5,812,668 | A | 9/1998 | Weber |
| 6,230,200 | B1 | 5/2001 | Forecast |
| 6,633,772 | B2 | 10/2003 | Ford |
| 7,177,951 | B1 | 2/2007 | Dykeman et al. |
| 7,499,907 | B2 | 3/2009 | Brown |
| 7,523,130 | B1 | 4/2009 | Meadway |
| 7,908,242 | B1 | 3/2011 | Achanta |
| 7,990,797 | B2 | 8/2011 | Moshayedi |
| 10,339,147 | B1 * | 7/2019 | Barnes .................. G06N 5/046 |
| 2001/0051949 | A1 | 12/2001 | Carey |
| 2002/0010739 | A1 | 1/2002 | Ferris et al. |
| 2002/0032676 | A1 | 3/2002 | Reiner |
| 2004/0162853 | A1 | 8/2004 | Brodersen |
| 2006/0037075 | A1 | 2/2006 | Frattura |
| 2006/0268742 | A1 | 11/2006 | Chu et al. |
| 2008/0059115 | A1 | 3/2008 | Wilkinson |
| 2008/0133456 | A1 | 6/2008 | Richards |
| 2008/0222150 | A1 * | 9/2008 | Stonecipher ........ G06F 16/2365 707/E17.045 |
| 2009/0018996 | A1 | 1/2009 | Hunt |
| 2009/0063893 | A1 | 3/2009 | Bagepalli |
| 2009/0172191 | A1 | 7/2009 | Dumitriu et al. |
| 2009/0182767 | A1 | 7/2009 | Meadway |
| 2009/0183167 | A1 | 7/2009 | Kupferschmidt |
| 2010/0082577 | A1 | 4/2010 | Mirchandani |
| 2010/0211577 | A1 | 8/2010 | Shimizu |
| 2010/0241646 | A1 | 9/2010 | Friedman |
| 2010/0274983 | A1 | 10/2010 | Murphy |
| 2010/0312756 | A1 | 12/2010 | Zhang |
| 2010/0332475 | A1 | 12/2010 | Birdwell |
| 2011/0219169 | A1 | 9/2011 | Zhang |
| 2011/0307491 | A1 | 12/2011 | Fisk |
| 2012/0089610 | A1 | 4/2012 | Agarwal |
| 2012/0109888 | A1 | 5/2012 | Zhang et al. |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0173232 | A1 | 6/2014 | Reohr |
| 2014/0188841 | A1 | 7/2014 | Sun |
| 2014/0236548 | A1 | 8/2014 | Conduit |
| 2015/0039712 | A1 | 2/2015 | Frank et al. |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2015/0356085 | A1 * | 12/2015 | Panda ...................... G06N 5/04 707/748 |
| 2016/0026667 | A1 | 1/2016 | Mukherjee et al. |
| 2016/0034547 | A1 | 2/2016 | Lerios |
| 2016/0048849 | A1 | 2/2016 | Shiftan |
| 2016/0070725 | A1 * | 3/2016 | Marrelli ............ G06F 16/24578 707/692 |
| 2016/0085789 | A1 * | 3/2016 | Fuchs .................. G06F 16/215 707/691 |
| 2016/0321316 | A1 | 11/2016 | Pennefather |
| 2017/0193016 | A1 | 7/2017 | Kulkarni |
| 2018/0268015 | A1 | 9/2018 | Sugaberry |
| 2018/0285414 | A1 | 10/2018 | Kondiles |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Angskun T., Bosilca G., Dongarra J. (2007) Self-healing in Binomial Graph Networks. In: Meersman R., Tari Z., Herrero P. (eds) On the Move to Meaningful Internet Systems 2007: OTM 2007 Workshops. OTM 2007. Lecture Notes in Computer Science, vol. 4806. Springer, Berlin, Heidelberg.

Anonymous Release; DPDK documentation Contents; DPDK, Aug. 18, 2015; pp. 1-528 Retrieved from internet on Feb. 23, 2021: https://dpdk.readthedocs.io/_downloads/en/v2.1.0/pdf/.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

European Patent Office; Extended European Search Report; EP App. No. 17880815.0; dated Apr. 2, 2020; 10 pgs.

Hashem et al., The rise of "big data" on cloud computing: Review and open research issues, 18 pages (Year: 2014).

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Remote Direct Memory Access Transport for Remote Procedure Call, Internet Engineering Task Force (IETF), T. Talpey, Request for Comments: 5666, Category: Standards Track, ISSN: 2070-1721, Jan. 2010.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

T. Angskun, G. Bosilca, B. V. Zanden and J. Dongarra, "Optimal Routing in Binomial Graph Networks," Eighth International Conference on Parallel and Distributed Computing, Applications and Technologies (PDCAT 2007), Adelaide, SA, 2007, pp. 363-370.

* cited by examiner

FIG. 4

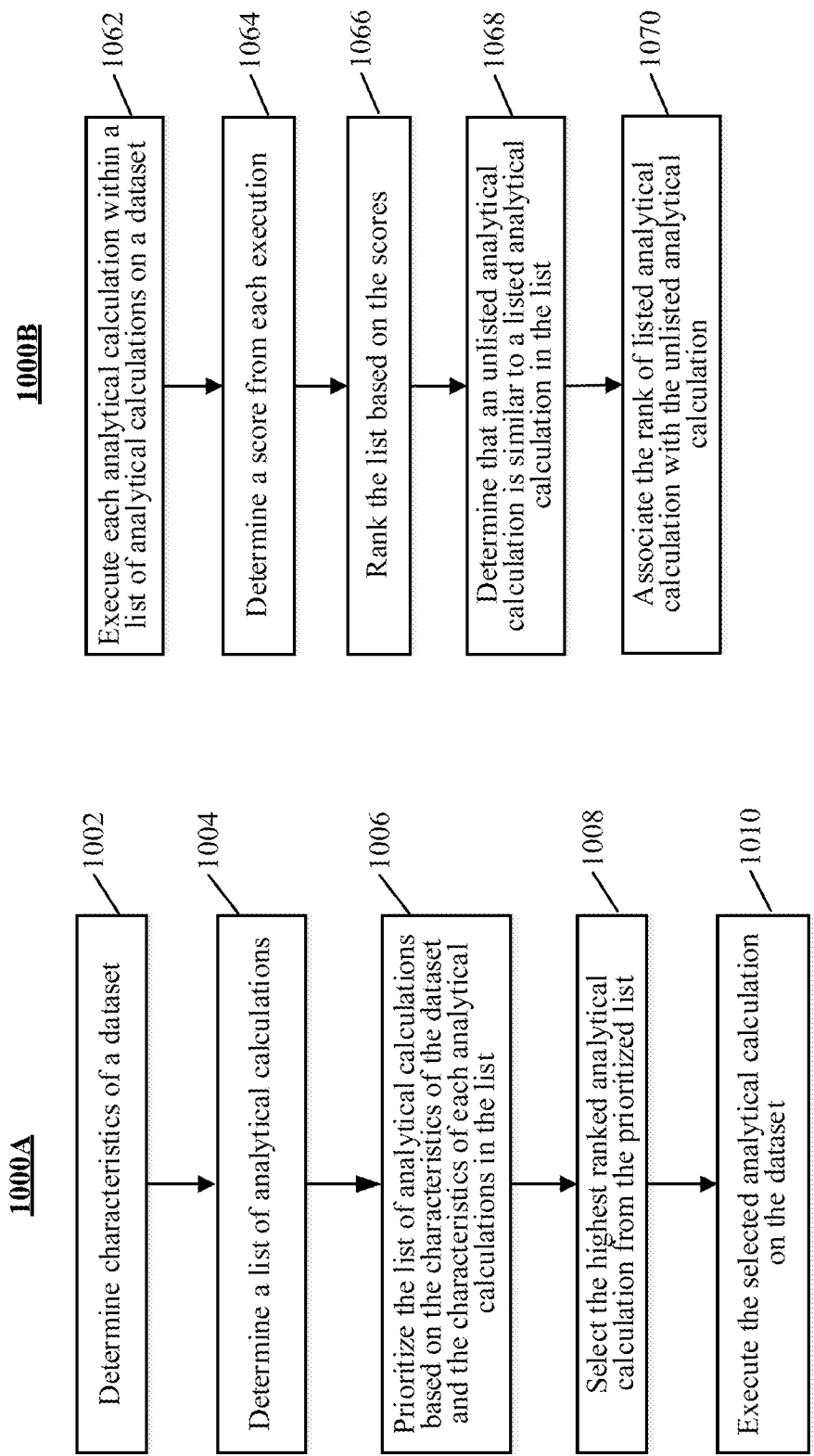

EFFICIENT DATABASE MANAGEMENT SYSTEM AND METHOD FOR USE THEREWITH

CROSS REFERENCE TO RELATED APPLICATIONS

The present U.S. Utility Patent Application claims priority pursuant to 35 U.S.C. § 120 as a continuation of U.S. Utility application Ser. No. 16/928,509, entitled "EFFICIENT DATABASE MANAGEMENT SYSTEM AND METHOD FOR PRIORITIZING ANALYTICAL CALCULATIONS ON DATASETS", filed Jul. 14, 2020, which is a continuation of U.S. Utility application Ser. No. 15/840,558, entitled "EFFICIENT DATABASE MANAGEMENT SYSTEM AND METHOD FOR PRIORITIZING ANALYTICAL CALCULATIONS ON DATASETS", filed Dec. 13/2017, issued as U.S. Pat. No. 10,747,738 on Aug. 18, 2020, which claims priority pursuant to 35 U.S.C. § 119(e) to U.S. Provisional Application No. 62/433,901, entitled "EFFICIENT DATABASE MANAGEMENT SYSTEMS", filed Dec. 14, 2016, all of which are hereby incorporated herein by reference in their entirety and made part of the present U.S. Utility Patent Application for all purposes.

U.S. Utility application Ser. No. 15/840,558, is also related to U.S. Provisional Application No. 62/403,231, entitled "HIGHLY PARALLEL DATABASE MANAGEMENT SYSTEM," filed on Oct. 3, 2016, and U.S. Provisional Application No. 62/403,328, entitled "APPLICATION DIRECT ACCESS TO NETWORK RDMA MEMORY, filed on Oct. 3, 2016, both of which are hereby incorporated by reference in their entirety and made part of the present U.S. Utility Patent Application for all purposes.

FIELD OF THE DISCLOSURE

The present invention generally relates to a system and method for organizing and managing large volume of data, and more particularly relates to a massively parallel database management system optimized for managing time based data. More particularly still, the present disclosure relates to a manifest and a silo system in a massively parallel database management system, and a method for prioritizing analytical calculations.

DESCRIPTION OF BACKGROUND

With rapid development and widespread utilization of computer technologies in the last few decades, large volumes of digital data are generated on a daily basis. Organizing and managing such a huge amount of data has promoted the development of database technologies. Relational database management systems ("RDBMS"), such as Oracle Database Management System, Microsoft SQL Database Management System and MySQL Database Management System, have thus been proposed and gained broad acceptance for data management. Such database management systems store data by rows of tables. Querying and retrieving data from the conventional databases oftentimes include retrieving a list of records while such records contain information that is not requested. For example, the illustrative SQL query causes a conventional database management system to read all fifty rows from a disk drive storing the rows:

select column 1 from table 1 where key>100 and key<151

In the illustrative SQL query, column 1 is a column of a table 1, and key is another column (such as a primary key) of the table 1. While only data in column 1 is requested, data in other columns of table 1 is already read from a storage disk drive. Furthermore, the conventional database management systems do not store data in an ordered manner on physical disk drives. However, many types of data (such as network logs, network access data, financial transaction data, weather data, etc.) are of extremely high volume and ordered by time. Accordingly, there is a need for a highly parallel and efficient database system that is optimized for managing large volumes of time based data. There is a further need for a highly parallel and efficient database system for storing data by columns for faster and more efficient data retrieval.

Conventional database management systems typically generate a large number of indexes for data. Such indexes logically identify rows (also referred to herein as records). Rows of data within a table are stored on disk drives. Related rows, such as rows of a particular order by time, are usually not consecutive stored on disk drives. Rows could also be related by other factors. Retrieving a set of related records thus involves multiple disk reads of data dispersed at different locations on a disk drive. Accordingly, there is a need for a highly parallel and efficient database system for storing related data consecutively or nearby on a disk drive to reduce the number of disk reads in serving a data request, and providing an efficient structure for locating such data on a disk drive. There is a further need for the new database management system to load the structure in memory for higher performance in locating data on disk drives.

To improve data retrieval performance, conventional database management systems take advantage of high end hardware platforms, such as a computer with multiple sockets and a large amount of memory. Each of the sockets includes one or more processing units (also interchangeably referred to herein as cores). A processing unit housed in one socket can access resources (such as disk drives and memory) local to another socket. Such cross socket access incurs a performance penalty due to latency and bandwidth limitations of the cross-socket interconnect. Accordingly, there is a need for a highly parallel and efficient database management system that improves performance by avoiding the cross socket boundary access. The present disclosure incorporates novel solutions to overcome the above mentioned shortcomings of conventional database management systems.

OBJECTS OF THE DISCLOSED SYSTEM, METHOD, AND APPARATUS

Accordingly, it is an object of this disclosure to provide a parallel database management system optimized for managing large volumes of time based data.

Another object of this disclosure is to provide a parallel database management system with silo systems that utilize only local resources for faster performance.

Another object of this disclosure is to provide a parallel database management system with silo systems that utilize only local resources to avoid latency and bandwidth limitations inherent in interconnect access.

Another object of this disclosure is to provide a parallel database management system with silo systems that utilize only local memory and local disk drives for faster performance.

Another object of this disclosure is to provide a parallel database management system with a signal rich manifest describing physical location of data stored on a disk drive for locating the maximum amount of data while taking the least amount of memory and disk space.

Another object of this disclosure is to provide a parallel database management system with a hierarchical manifest describing physical location of data stored on a disk drive for faster data retrieval from a storage disk by direct reads.

Another object of this disclosure is to provide a parallel database management system with a manifest for each segment.

Another object of this disclosure is to provide a parallel database management system with a manifest stored in each segment.

Another object of this disclosure is to provide a parallel database management system with a manifest stored at end of each segment.

Another object of this disclosure is to provide a parallel database management system with a hierarchical manifest in a physically backed memory region for faster access minimizing page faults.

Another object of this disclosure is to provide a parallel database management system with a hierarchical manifest organizing data by cluster keys.

Another object of this disclosure is to provide a parallel database management system with a hierarchical manifest organizing data by time based data buckets for each cluster key.

Another object of this disclosure is to provide a parallel database management system with a hierarchical manifest organizing data by time based data buckets of equal time frames.

Another object of this disclosure is to provide a parallel database management system with time based data stored on disk drives based on the order of time stamps of the data.

Another object of this disclosure is to provide a parallel database management system with time based data of different time periods stored in different segment groups.

Another object of this disclosure is to provide a parallel database management system with data records stored by columns for faster performance in retrieving data from physical disk drives.

Another object of this disclosure is to provide a parallel database management system with data records stored by columns for reducing reads of physical disk drives in data retrieval.

Another object of this disclosure is to provide a parallel database management system with data records stored by columns in coding blocks of different coding lines on a segment to allow fewer reads in data retrieval.

Another object of this disclosure is to provide a parallel database management system to store data records by columns in a segment with a manifest indicating the location of the data on the physical disk drive of the segment for faster data retrieval.

Another object of this disclosure is to provide a parallel database management system to store a data record along with a confidence about the accuracy of the data record.

Another object of this disclosure is to provide a parallel database management system that prioritizes analytical calculations on large datasets.

Another object of this disclosure is to provide a parallel database management system that prioritizes analytical calculations on large datasets based on characteristics of the analytical calculations and characteristics of the dataset.

Another object of this disclosure is to provide a parallel database management system that prioritizes an analytical calculation based the rank of a similar analytical calculation based on characteristics of the two analytical calculations.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a massively parallel database management system for managing massive volumes of data. In particular, massively parallel database management system is optimized for managing time based data. A database management software application running in user space directly accesses a disk drive to store and retrieve data for faster performance. The time based data is stored in coding blocks of segments of a segment group of a cluster. Coding blocks of different segments within the same segment group are grouped in coding lines. The cluster includes a set of nodes, each of which includes one or more storage disk drives. Each disk drive includes one or more segments.

Each node includes one or more sockets while each socket houses a set (meaning one or more) of processing units. A socket and its processing units are operatively coupled to a set of local resources, such as a local memory, a local disk drive and a local network interface card. A processing unit accesses the local devices at a higher speed than accesses to remote devices that are local to a different socket. The two sockets are interconnected by an interconnect interface. The cross socket access is slower due to latency and bandwidth limitation in the interconnect interface. A socket, the process units housed in the socket, physical devices local to the socket and an operating system running on the processing units are termed herein as a silo. The massively parallel database management system implementing the silo oriented computing achieves faster performance due to the fact that the data management processing within different silos uses only local devices. Data management threads are pinned to specific processing units with a silo such that the threads only access local memory and other local resources.

For improved performance in data retrieval reads and data storing writes, the novel data management system accesses disk drives directly without going through middle layers, such as a file system of an operating system. The data management system software application maintains a manifest to track the exact physical location where a particular piece of data is stored in a segment of a physical disk drive. The manifest embodies a compact structure such that it minimizes storage overhead for relational information in a segment while occupying a small footprint. The manifest is thus optimized to occupy less memory and disk drive space while providing the maximum amount of signal. The manifest is stored, for example, at the end of each segment while data is stored in coding blocks from the beginning of the segment.

Since data requests usually demand data in certain columns, but not all columns of data records, the database management system software application further improves on conventional technologies by storing data by columns in coding blocks on segments within a cluster. By retrieving only data of one or multiple columns, the number of reads is reduced because the amount of data read is less that the total amount of data within all of the relevant records. To further speed up data queries, different segment groups store time based data of different time periods. In such a case, a requested data record is first quickly narrowed to a segment group based on the time stamp of the data record.

The manifest indicates the location of data stored in the corresponding segment. The manifest organizes data records by cluster keys. For each cluster key, data is organized as data buckets of sequential, but not necessarily contiguous, time periods. The different time periods are of the same time duration (also referred to herein as time frame) in one implementation. For each data bucket, data is stored by columns, wherein each stored column is indicated by coding lines and storage byte offsets.

Further in accordance with various embodiments, the present teachings provide a database management system that stores data records along with confidence data. The confidence data indicates a confidence in the accuracy of a data record or data point. In addition, analytical calculations for analyzing large datasets are prioritized for effective data analysis. The prioritization can be based on characteristics of the analytical calculations and/or characteristics of a particular dataset. Furthermore, a rank of one analytical calculation is assigned to a similar analytical calculation. The ranks are determined based on, for example, execution results of the analytical calculations on the dataset.

Further in accordance with the present teachings is a method for prioritizing analytical calculations on a dataset stored in a large database. The method includes retrieving the dataset from the large database. The dataset includes a set of data records. The method further includes determining a set of data characteristics of the dataset, determining a list of analytical calculations, prioritizing the list of analytical calculations based on the set of data characteristics and a set of analytical calculation characteristics of the list of analytical calculations to associate a rank to each analytical calculation within the list, selecting an analytical calculation from the list based the ranks, and executing the selected analytical calculation on the dataset. The set of data characteristics includes a number of data records within the dataset. The set of data characteristics also includes a data type of a column of each data record within the dataset. The list of analytical calculations further includes an analytical calculation that determines an abnormality of data records within the dataset. The abnormality is an error, data distortion, or data noise. The list of analytical calculations includes a first analytical calculation and a second analytical calculation. Execution of the first analytical calculation on the dataset is faster than execution of the second analytical calculation on the dataset.

Further in accordance with the present teachings is a method for prioritizing analytical calculations on datasets stored in a large database. The method includes determining a list of analytical calculations, and retrieving a dataset from a large database. The dataset includes a set of data records. The method also includes executing each analytical calculation within the list of analytical calculations on the dataset to determine a result score to form a corresponding list of result scores. In addition, the method includes determining a rank for each analytical calculation within the list of analytical calculations based on the list of result scores, and comparing a first analytical calculation with analytical calculations within the list of analytical calculations to determine that the first analytical calculation is similar to a second analytical calculation within the list of analytical calculations. The first analytical calculation is not in the list of analytical calculations. The method further includes assigning the rank of the second analytical calculation to the first analytical calculation. The first analytical calculation is determined to be similar to the second analytical calculation based on characteristics of the first and second analytical calculations.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 4 is a table illustrating time stamp based data in accordance with this disclosure.

FIG. 10A is a flowchart depicting a process by which a computer prioritizes analytical calculations in accordance with the teachings of this disclosure.

FIG. 10B is a flowchart depicting a process by which a computer prioritizes analytical calculations in accordance with the teachings of this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
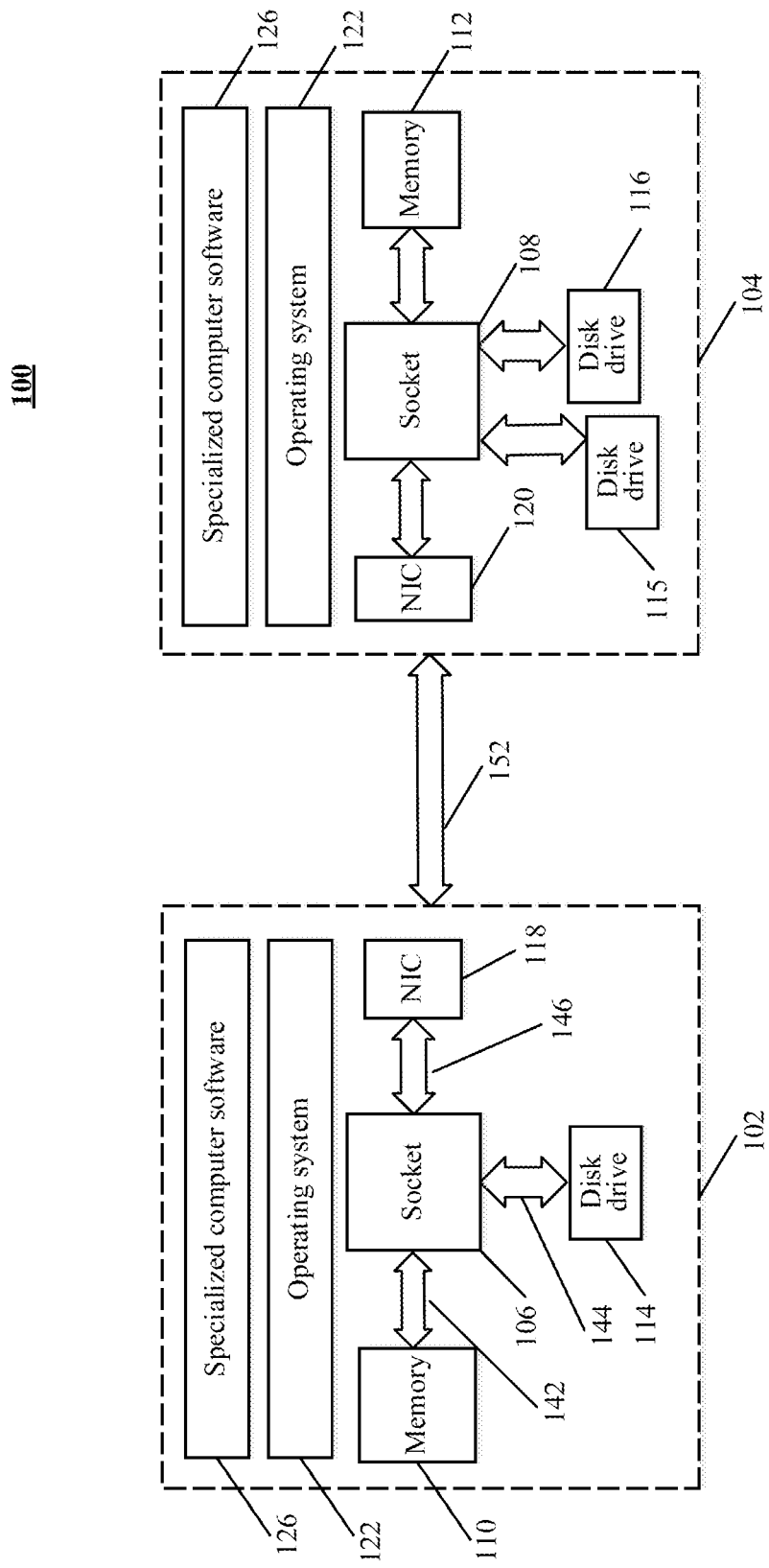
FIG. 1 is a simplified block diagram of a node within a cluster of a highly parallel database management system in accordance with this disclosure.

Turning to the Figures and to FIG. 1 in particular, a simplified block diagram of a node within a cluster of a highly parallel database management system is shown and generally indicated at 100. The database storage node 100 includes two sockets 106 and 108, each of which includes one or more processing units (also interchangeably referred to herein as cores and central processing units). The node 100 also includes a memory (such as 32 GB of DRAM) 110, a storage disk drive 114, and a networking interface ("NIC") 118 that are operatively coupled to the socket 106. An operating system (such as Linux operating system) 122 runs on the processing units of the socket 106. The memory 110, the socket 106, the NIC 118 and the disk drive 114 are collectively referred to herein as a silo 102. The silo system 102 includes all processing units within the socket 106 and all the disk drives (such as the disk drive 114) operatively coupled to the socket 106. The node 100 further includes a memory 112, two storage disk drives 115 and 116, and a NIC 120 that are operatively coupled to the socket 108. The memory 112, the storage disk drives 115-116, and the NIC 120 are collectively referred to herein as a silo 104.

A specialized computer software 126 for managing data runs on the operating system 122. In one implementation, the operating system 122 is a single instance running on the sockets 106-108 of the node 100. In one implementation, the specialized computer software 126 programs each silo to perform a part of a task. The specialized computer software 126 can also program one silo (such as the silo 102) to perform one task, and another silo (such as the silo 104) to perform a different task.

The disk drives 114-116 are storage devices for storing data, and can be, for example, Non-volatile Random-Access Memory ("NVRAM"), Serial Advanced Technology Attachment ("SATA") Solid State Drives ("SSDs"), or Non-volatile Memory Express ("NVMe"). As used herein, drives, storage drives, disk drives and storage disk drives are interchangeably used to refer to any types of data storage devices, such as NVRAM, SATA, SATA SSDs and NVMe. Each of the disk drives (such as the drives 114-116) has one or more segments. For ease of illustration, each of the disk drives 114-116 is said to include only one segment and interchangeably referred to as a segment herein. Segments within a cluster form a segment group.

The processing units within the socket 106 directly access the memory 110, the NIC 118 and the disk drive 114 over electrical interfaces, such as Peripheral Component Interconnect Express ("PCIe"). For example, the socket 106 directly accesses these physical devices via a PCIe bus, a memory control, etc. Similarly, the socket 108 directly access the memory 112, the NIC 120 and the disk drives 115-116.

In contrast, the processing unit(s) within the socket 108 accesses the memory 110, the disk drive 114 and the NIC 118 via an interconnection interface 152. Similarly, the processing unit(s) within the socket 106 accesses the NIC 120, the disk drives 115-116 and the memory 112 via the same interconnection interface 152. The access over the interconnection interface 152 between the sockets 106 and 108 is referred to herein as an indirect connection. In other words, a socket within each silo directly accesses physical devices within the same silo, and indirectly accesses physical devices within a different silo. Physical devices within one silo are said to be local to the silo and remote to a different silo.

In one implementation, the interface 152 is a QuickPath Interconnect ("QPI") interface or an UltraPath Interconnect ("UPI") interface. The indirect access between the silos 102-104 incurs a performance penalty due to latency inherent in indirect access. Furthermore, the interconnect interface 152 becomes a bottleneck in indirect access. In addition, the interconnect interface 152 has a bandwidth limitation. Accordingly, accessing remote devices over the interconnect interface 152 is less desirable. To overcome the performance issues imposed by the indirect access, the present teachings provide the specialized database management system software 126 to implement a silo oriented database system.

In the silo based data management system, the instance of the specialized database management system software 126, running on the processing unit(s) within the socket 106, accesses only the local resources, such as the memory 110, the NIC 118 and the disk drive 114 that are local to the socket 106 and all the processing units within the socket 106. Similarly, the instance of the software 126 running on the processing unit(s) within the socket 108 accesses only the NIC 120, the memory 112 and the disk drives 115-116 local to the socket 108 and all the processing units within the socket 108. In other words, the instance of the software 126 running on the socket 108 do not access the remotely connected physical devices 110, 114, 118 when, for example, data queries are performed. However, cross-silo access is possible in certain cases, such as system startup, shutdown and administrative actions. For instance, performance polling is an administrative action. It should be noted that the silo boundary based computing is programmed for a set of predetermined functionality. For example, for storing data into and retrieving data from a database and disk drives, the specialized program 126 limits its access to local devices and avoids remote access to a different silo. The silo boundary control is further illustrated by reference to FIGS. 2A, 2B and 2C.

Figure 2A:
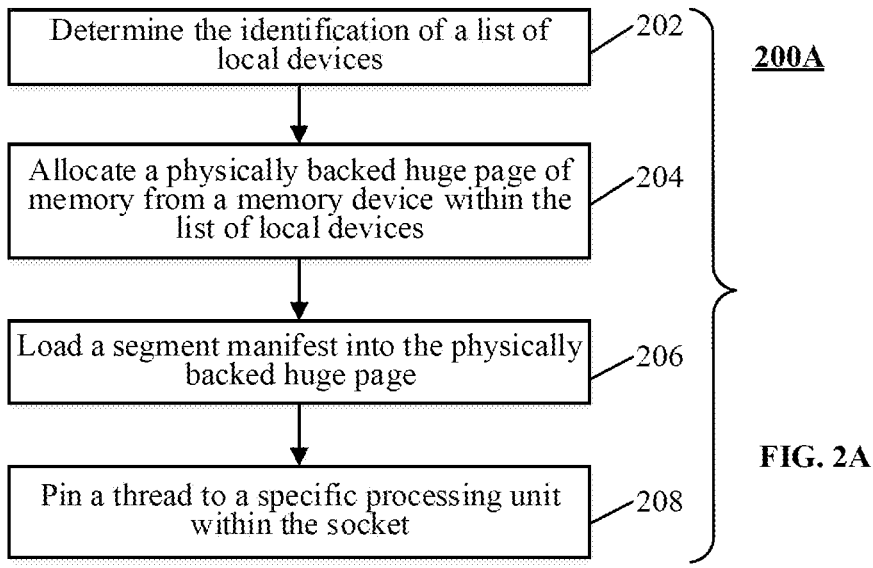
FIG. 2A is a flow chart illustrating a process by which a node within a cluster of a highly parallel database management system implements silo oriented resource accesses in accordance with this disclosure.
Figure 2B:
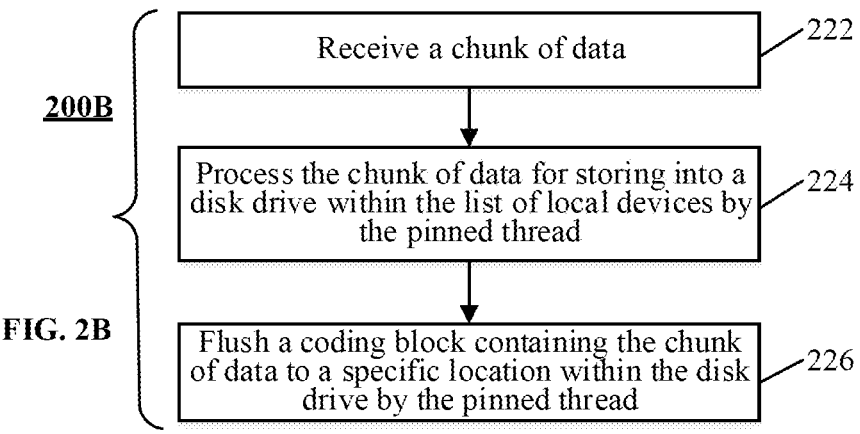
FIG. 2B is a flow chart illustrating a process by which a node within a cluster of a highly parallel database management system implements silo oriented resource accesses in accordance with this disclosure.
Figure 2C:
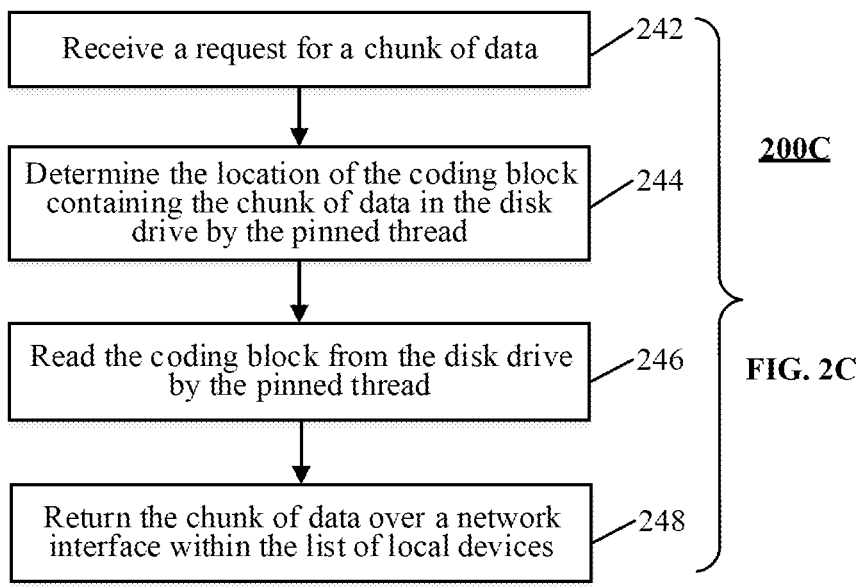
FIG. 2C is a flow chart illustrating a process by which a node within a cluster of a highly parallel database management system implements silo oriented resource accesses in accordance with this disclosure.

Referring to FIGS. 2A, 2B and 2C, three flow charts illustrating processes by which the node 100 implements the silo oriented highly efficient database management are shown and generally indicated at 200A, 200B and 200C respectively. The processes 200A-200C are performed by the specialized database management program 126. The process 200A is initiated when the program 126 is loaded and run by the processing units within a socket of a silo, such as the socket 106 of the silo system 102. In one implementation, the software program 126 runs as a process in the silo 102. The process includes one or more threads. The threads within the process share the same virtual address space and can all access the same physical resources (such as memory and other physical devices). At 202, the specialized database management software 126 determines the identification of a list of local devices, such as the processing units within the socket 106, the memory 110, the disk drive 114 and the NIC 118. For instance, the software 126 queries the operating system 122 for identification and other information of the list of local devices. Each physical device within the list can be identified by, for example, a name or a handle.

At 204, the special software program 126 performs a specialized memory allocation to allocate a huge page of the memory 110. The huge page is a big swatch of memory (such as 1 GB) that is a virtual memory region. The huge page is physically backed by the memory 110. In other words, the virtual memory region corresponds to a region of the same size on the memory device 110. Multiple accesses to the virtual memory region result in the same physical region being accessed. A processor maintains a cache of virtual-to-physical page mappings (i.e., the Translation Lookaside Buffer ("TLB")); and by utilizing a huge page the special software is able to address larger regions of memory with fewer TLB cache entries. The physically backed huge page is also referred to herein as a physical huge page of memory. The physically backed huge page is within the silo boundary, and corresponds to a segment manifest.

At 206, the specialized software program 126 loads a segment manifest into the physically backed huge page. The manifest describes a hierarchical structure indicating the location of data in the segment (such as the disk drive 114). In one implementation, each segment stores a manifest. A segment with a manifest is further illustrated by reference to FIG. 3.

Figure 3:
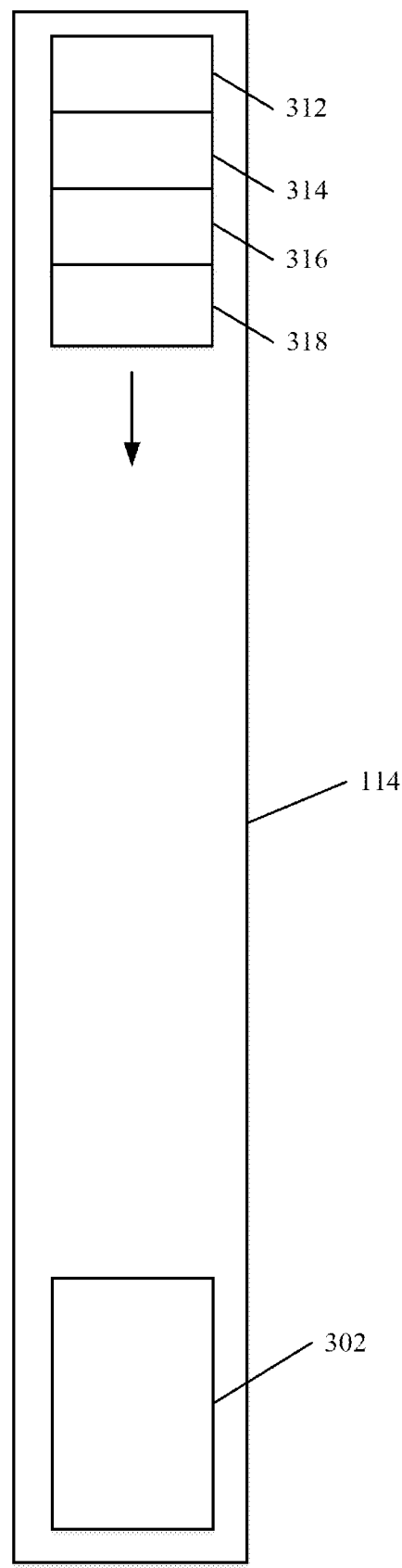
FIG. 3 is a simplified block diagram depicting a segment with a manifest in accordance with this disclosure.

Turning to FIG. 3, a simplified block diagram depicting a segment 114 with a manifest 302 is shown. In the segment 114, data is stored in coding blocks, such as the coding blocks 312-318. Coding blocks are written into the segment 114 in a sequential order starting from the beginning of the segment 114. In one implementation, the manifest 302 of the segment 114 is stored at the end of the segment 114. In one embodiment, the manifest 302 occupies a fixed size of the disk space on the segment 114. As further described below, the manifest 302 contains the maximum amount of signal for a certain size of storage. The signal is data indicating information about other data, such as the physical location of a block of data within a storage drive.

Returning to FIG. 2A, the manifest resides in memory for the best performance in locating data stored in the local disk drive 114. At 208, the specialized database software 126 pins a thread within the process of the software 126 to one or more processing units (such as CPUs and cores) within the socket 106 via operating systems calls. For example, the calls include "pthread_setaffinity_np" and/or "sched_setaffinity" on a Linux operating system. Operations (such as searches) on the loaded manifest that are performed by the pinned thread are then only performed on the memory 110 within the silo 102, not the memory 112 that is remote to the silo 102.

Referring to FIG. 2B, at 222, the specialized database management software 126 receives a chunk of data for storing into the disk drive 114 via the NIC 118. The chunk of data is some amount of data, such as a set of time based data records of the same or different cluster keys. At 224, the pinned thread processes the chunk of data for storing it onto the disk drive 114. For example, the pinned thread places the chunk of data into an open coding block, and updates the manifest to reflect the exact location where the chunk of data is stored in the segment 114. When the open coding block is full, at 226, the pinned thread directly flushes the coding block into the segment 114. It should be noted that the updated manifest is also flushed to the segment 114 periodically or when certain events occur.

Referring to FIG. 2C, at 242, the specialized database management software 126 receives a request for a chunk of data, such as a set of columns of certain records. At 244, the pinned thread searches the manifest in the physically backed huge page to determine the location of the coding blocks containing the requested data in the segment 114. At 246, the pinned thread reads the coding blocks from the segment 114. At 248, the pinned thread returns the request chunk of data over the NIC 118. It should be noted that the processes 200B-200C directly accesses the disk drive 114 using its identification determined by the process 200A. Furthermore, the process 200C directly accesses the NIC 118 using its identification determined by the process 200A. Accordingly, the operations to store a chunk of data are performed within a single silo; and the operations for retrieving and returning a chunk of data are also performed within a single silo. The silo oriented database management thus provides superior performance and efficiency.

Many types of data are generated in great volumes and of similar or same formats. For example, a computer network logger produces large volumes of records of the same format. Each record includes a time stamp (meaning the time when the record is generated), a cluster key, and a number columns of other types of data. The cluster key can identify, for instance in network log data, a source IP address and a destination IP address. The source IP address is the IP address of the computer or device sending the data contained in the record, while the destination IP address is the IP address of the computer or device receiving the data contained in the record. Another example of the time based data is weather data. Such time stamp based data is uploaded to a database management system to be stored in disk drives, such as the disk drives 114-116. A logical representation of the time based data is further illustrated by reference to FIG. 4.

Figure 4:
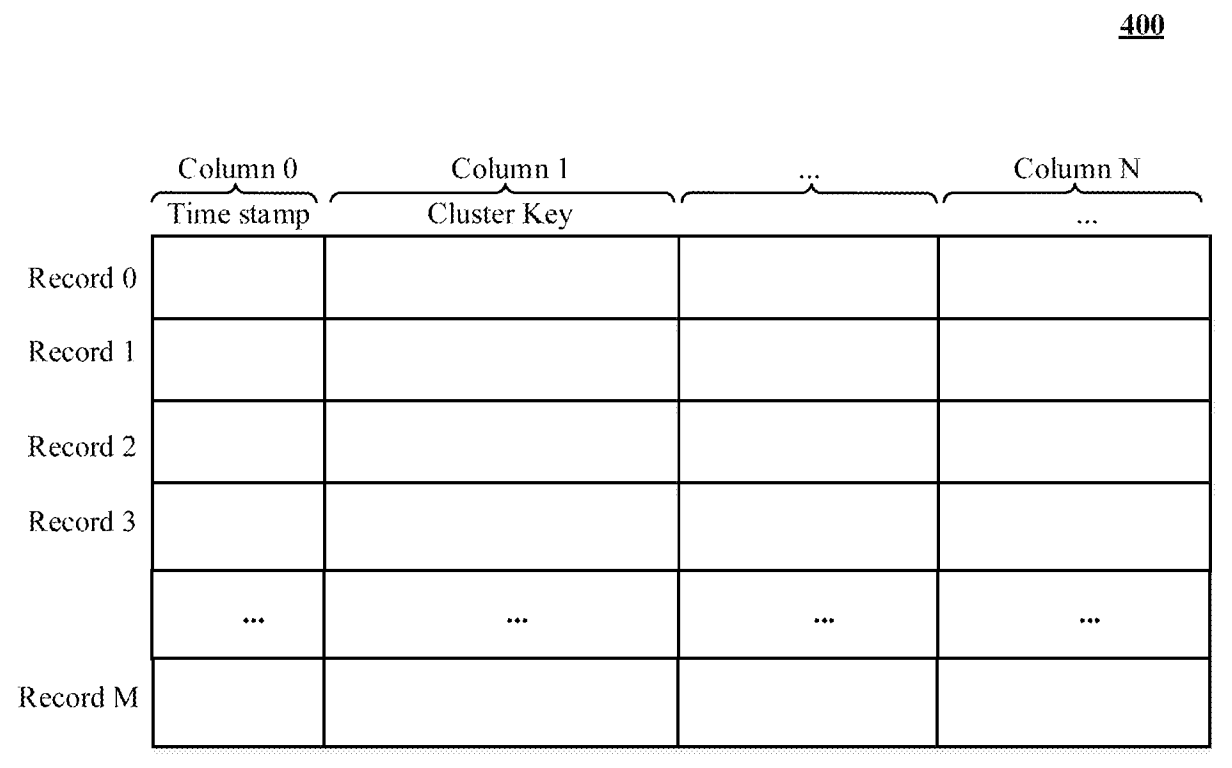

Referring to FIG. 4, a table illustrating time stamp based data is shown and generally indicated at 400. The data is represented as a list of records 0-M (M stands for a positive integer). Each record has a time stamp in column 0, such as Oct. 12, 2016, 19:03:01, CST. The time stamp may further include additional information, such as milliseconds. A time stamp can also be represented by an integer, instead of a text string. Column 1 of the table 400 contains the cluster key of each record. Columns 2 through N (N stands for a positive integer) contain other data of each record.

The records with the same cluster key are said to be related. Taking a network logger as an example, the cluster key is the pair of source IP address and the destination IP address. All records with the same cluster key are data sent from a particular computer or device to another particular computer or device, and are said to be related herein. The related records have different time stamps and are also ordered by the time stamps. For instance, records 0-500 have a same cluster key while records 501-1000 share a different cluster key.

To maximize the performance in serving requests for such data after it is stored on the disk drives 114-116, the present database management system stores the records 0-M based on columns, instead of rows. Data queries usually request one or more columns of certain records, such as records during a particular time period. Storing the records 0-M by columns allows the minimum amount of reads to retrieve the desired data from a disk drive. The column based data storage in the highly parallel database management system is further illustrated by reference to FIG. 5.

Figure 5:
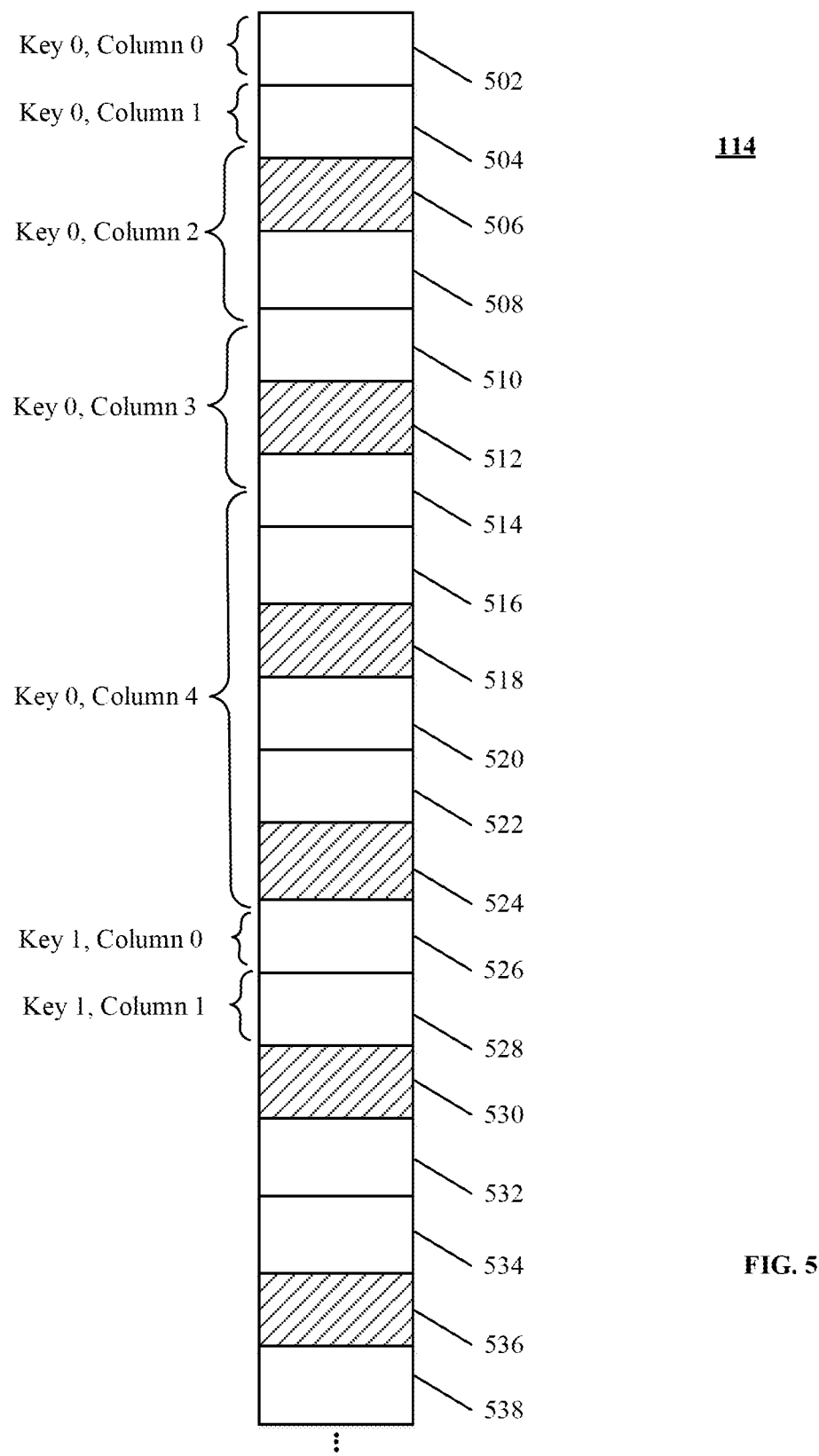
FIG. 5 is a simplified block diagram illustrating the layout of records stored in a segment in accordance with this disclosure.

Referring to FIG. 5, a simplified block diagram illustrating the layout of records stored in the segment 114 is shown. A set of representative coding blocks of data are indicated at 502 through 538 with the coding blocks 506,512,518,524, 530,536 being the parity blocks storing parity information for the corresponding coding lines. Each coding block of the coding blocks 502-538 is associated with a coding line that encompasses all segments within a segment group.

For example, data of Column 0 of the records with cluster key 0 (meaning a first cluster key) during a particular time period is stored in coding block 502; data of column 1 of the records with cluster key 0 during the particular time period is stored in coding blocks 502-504; data of column 2 of the records with cluster key 0 during the particular time period is stored in coding blocks 504, 508-510; data of column 3 of the records with cluster key 0 during the particular time period is stored in coding blocks 510 and 514; data of column 4 of the records with cluster key 0 during the particular time period is stored in coding blocks 514-516, 520-522,526; data of column 0 of the records with cluster key 1 during the particular time period is stored in coding block 526; data of column 1 of the records with cluster key 1 during the particular time period is stored in coding blocks 526-528; etc. Records of the cluster key 0 (as well as the cluster key 1) during the particular time period are ordered by their corresponding time stamps from, for example, the oldest to the newest.

Figure 6:
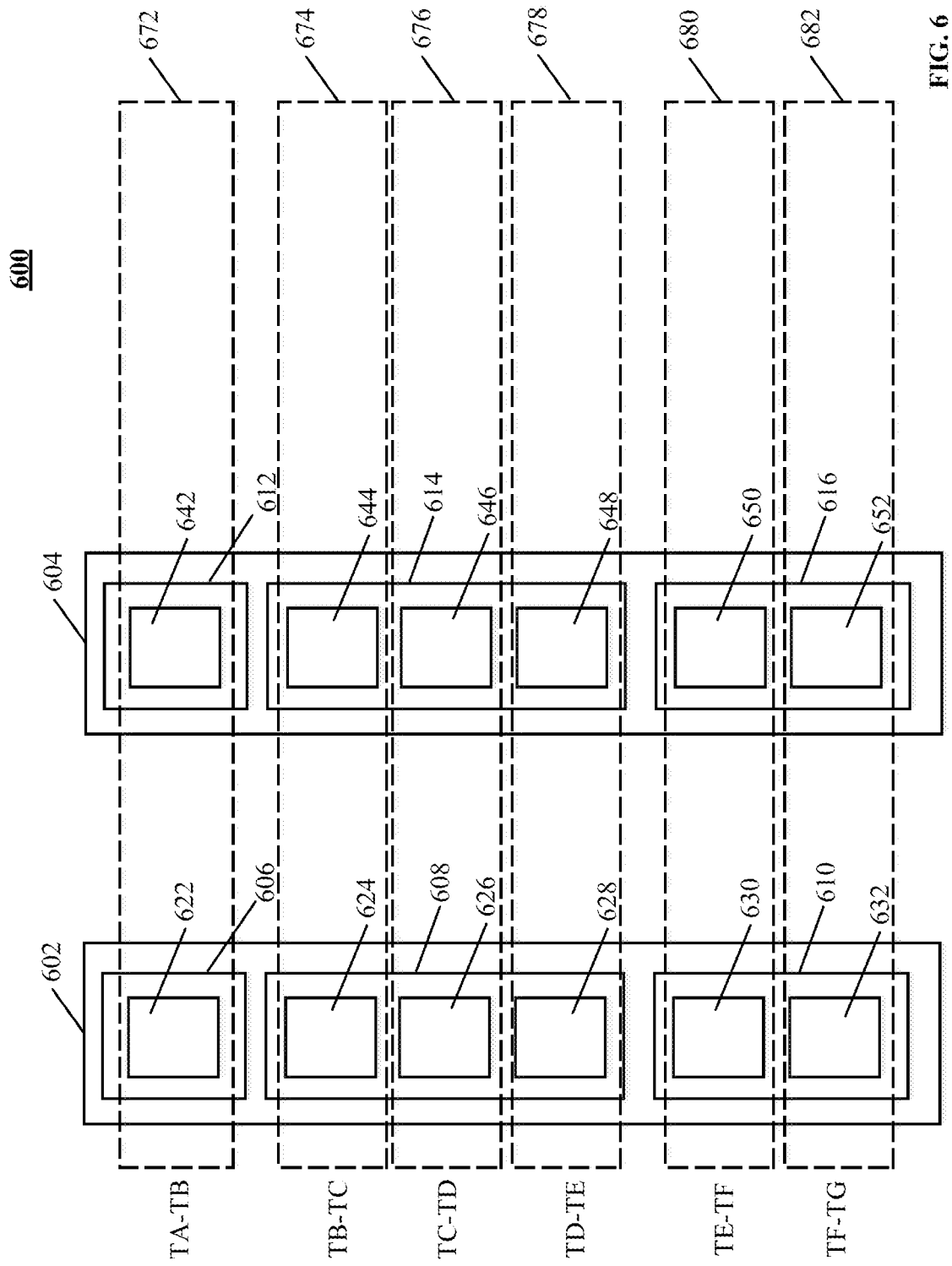
FIG. 6 is a simplified block diagram illustrating a storage cluster of time based data in accordance with this disclosure.

The time based data is sequentially stored in segments groups, each of which comprises a set of segments. A particular time period is mapped to a small fixed set of segment groups. For example, in one implementation, a particular time period is mapped to a unique segment group. As an additional example, a particular time period is mapped to two segment groups in a different implementation due to the fact that segment groups can overlap slightly in time at their boundaries. The mapping is further illustrated by reference to FIG. 6. Turning to FIG. 6, a simplified block diagram illustrating a storage cluster of time based data is shown and generally indicated at 600. The cluster 600 includes a set of nodes, of which two are indicated at 602 and 604. The node 602 includes data storage disk drives 606 (such as the drive 114), 608 and 610 while the node 604 includes disk drives 612, 614 and 616. The drive 606 includes a segment 622; the drive 608 includes three segments 624, 626 and 628; the drive 610 includes two segments 630 and 632; the drive 612 includes a segment 642; the drive 614 includes three segments 644, 646 and 648; and the drive 616 includes two segments 650 and 652. The illustrative cluster 600 includes segment groups 672, 674, 676, 678, 680 and 682. The segment group 672 includes the segments 622, 642 and other segments (not shown). As another example, the segment group 680 includes the segments 630 and 650.

The time based data between time TA and time TB is stored in the segment group 672; the time based data between time TB and time TC is stored in the segment group 674; the time based data between time TC and time TD is stored in the segment group 676; and so on. The time stamps TA, TB, TC, TD, TE, TF and TG are ordered from the oldest to the latest. Accordingly, when a data record is requested, the segment group storing the record is first determined based on the time stamp of the record. The time based storage of data in the cluster 600 thus provides an efficient and faster response to a data query. The lengths of different time periods, such as from TA to TB and from TB to TC, may differ.

When time based data records are received, a segment group and a segment within the segment group is first determined for storing the record. For example, a function is performed on the cluster key of the records to determine the segment group and the segment. The function is shown below:

function(cluster key)=segment group identifier and segment identifier

The data records are then forwarded to the node (such as the node 100) having the segment. The data records are then received by the target node. For example, the data record is received at 222 of the process 200B. The function (cluster key) enables even distribution data records between segments within a segment group.

Figure 7:
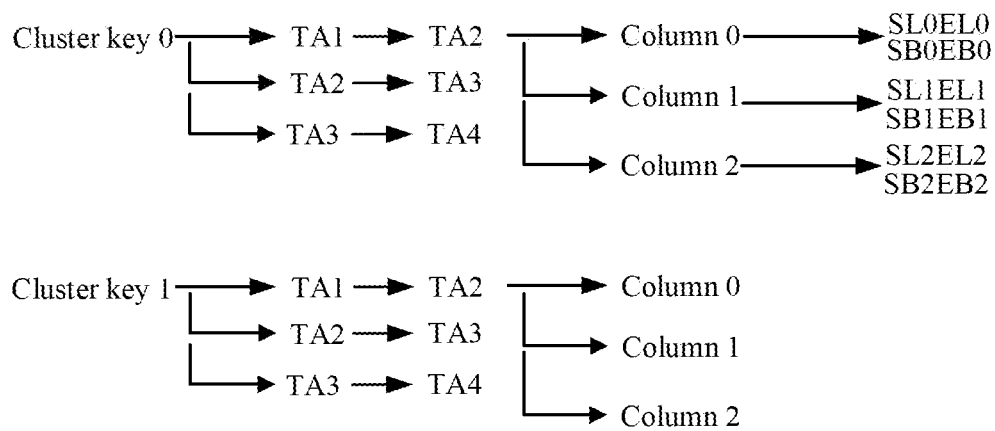
FIG. 7 is a simplified block diagram illustrating a logical representation of a manifest in accordance with this disclosure.

For efficiently placing and searching the time based data records, a hierarchical manifest for each segment is created and managed by the specialized database management software 126. The manifest is further illustrated by reference to FIGS. 7 and 8. Turning first to FIG. 7, a logical representation of a manifest is shown and generally indicated at 700. Time based data is grouped by cluster keys (such as the cluster key 0 and the cluster key 1); and time based data of each cluster key is grouped into buckets based on time. For example, a first data bucket of the cluster key 0 includes data from time stamp TA1 to time stamp TA2; a second data bucket includes data from time stamp TA2 to time stamp TA3; and a third data bucket includes data from time stamp TA3 to time stamp TA4. In one implementation, the time period for each data bucket is the same. In other words, TA2−TA1=TA3−TA2=TA4−TA3.

Within each data bucket, data records are organized by columns starting from column 0 to column 1 to column 2, and so on. Taking the cluster key 0 as an example, the data in the column 0 within the bucket of the period from TA1 to TA2 is stored in one or more coding blocks. The coding blocks are identified by a starting coding block number SL0, and an ending coding block number EL0. The coding block numbers SL0 and EL0 are also referred to herein as a starting coding block line and an ending coding block line. Accordingly, SL0 and EL0 identify one or more consecutive blocks on the segment storing the corresponding data. SB0 indicates the starting byte location from the beginning of the first coding block of the one or more consecutive coding blocks, while EB0 indicates the ending byte location from the beginning of the first coding block of the one or more consecutive blocks. In other words, the storage space starting from the byte at SB0 to the byte at EB0 in the one or more consecutive coding blocks store the data of the column 0 of the time based records in the data bucket between TA1 and TA2 of the cluster key 0. A data bucket cannot be empty. If no data is present for a particular time period, no bucket is stored, and during retrieval the lack of a bucket is interpreted as there being no data for that time period. In one embodiment, the manifest is immutable; and, if changes are required, the entire manifest is regenerated.

Figure 8:
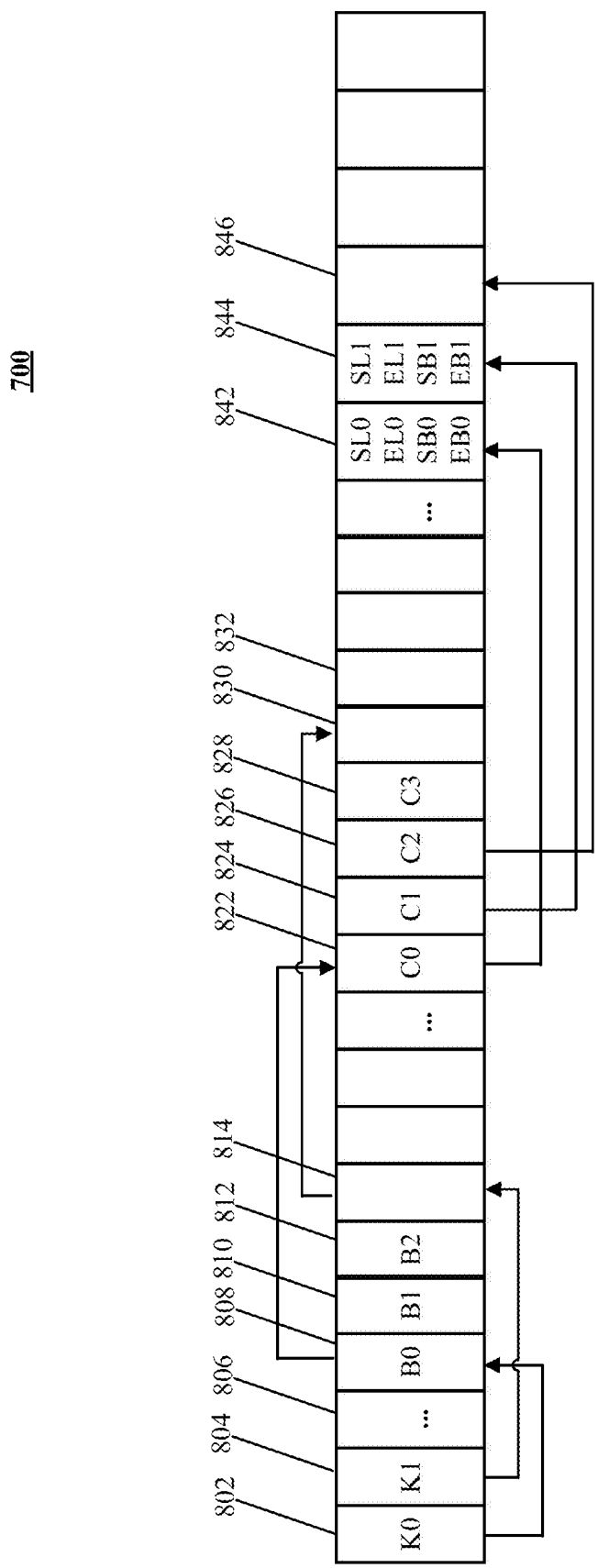
FIG. 8 is a simplified block diagram illustrating the memory structure of a manifest 700 in accordance with the teachings of this disclosure.

Referring to FIG. 8, a simplified block diagram illustrating the memory structure of the manifest 700 is shown. Cluster keys are stored in memory slots 802, 804 and 806 (indicating multiple memory slots). Each of these slot further stores a location, such as offset from the beginning of the manifest 700, of the corresponding buckets for the associated cluster key. Taking cluster key 0 in the memory slot 802 as an example, the data bucket location information is pointed to by the location and stored in the memory slots 808, 810 and 812. Taking the first data bucket as an example, it is indicated in the memory slot 808, which contains the time stamps of the bucket and a location pointing to the column information of the bucket. The location points to the memory slot 822, which stores information (such as data type) of the column 0 and a location pointing to the memory slot 842. The memory slot 842 stores the starting coding line number (SL0), the ending coding line number (EL0), the starting byte offset (SB0) and the ending byte offset EB0. There could be more than one memory slot (such as the memory slot 842) corresponding to a particular column when the span of data for a key/column pair intersects with one or more parity blocks. In such a case, more than one memory slot is required to store the multiple non-contiguous sub-spans. The compact structure of the manifest 700 contains the maximum amount of signal about stored data while using the least amount of memory.

In one embodiment, the time based data is compressed before it is stored into a segment of the node 100. For instance, the data of column 3 of a particular data bucket of a particular cluster key is encoded. The compression can be optionally performed on some columns. For example, the compression is not performed on the time stamp and cluster key columns. The compression form can be, for example, Run-Length Encoding ("RLE"). In one implementation, the compression is performed at 224 of the process 200B.

Certain types of data, such as genomic base pairs in a genome sequence, are created in such a manner that the data value is not known to be 100% accurate. In other words, there is not a 100% confidence in the accuracy of such data. For instance, a gene sequencer may estimate that a genomic base pair at a given location is 90% likely to be C-G and 10% likely to be A-T. As an additional example, when network traffic data is collected, the accuracy of each data record may be affected by the bit error rate of the network hardware or some other reasons. When mathematical and statistical analysis is later performed on such data without 100% confidence in its accuracy, the confidence of the calculated output data would be affected by the less than 100% confidence in the network traffic data. Accordingly, in one embodiment, the confidence information about the data is stored in the database. When the data records are retrieved from the database system storing such records, the corresponding data confidence is also retrieved. The data confidence is further incorporated and considered in the analysis of the data records.

Figure 9:
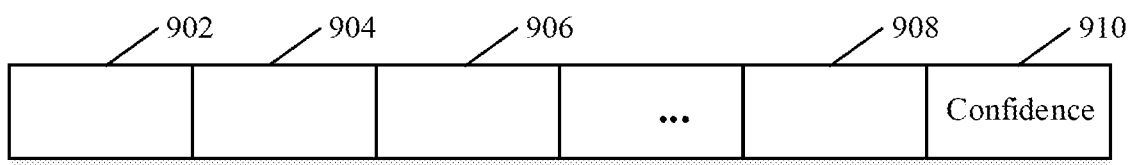
FIG. 9 is a data record without 100% confidence of accuracy in accordance with the teachings of this disclosure.

The data without 100% confidence in accuracy and the confidence information are further illustrated by reference to FIG. 9. Referring to FIG. 9, a data record without 100% confidence in its accuracy is shown and generally indicated at 900. The data record 900 includes columns 902 through 908. The confidence information is stored in one or more additional columns, such as the column 910. The data record 900 is first constructed in memory of a database management system computer and then stored in, for example, the segment 114.

Various datasets, such as network traffic data, financial transactions, and digital sensor data, are growing rapidly each day and becoming so large that humans can no longer examine such data and get a sense of what is unusual with such datasets. Accordingly, computers are needed to analyze these large datasets to determine whether any data abnormality are present. Computers generally analyze a dataset by performing analyses, such as calculating a standard deviation or a distance between data points. As used herein an analysis is also referred to as a calculation. On a large dataset, only a limited number of calculations could be effectively performed. Accordingly, prioritizing calculations to perform on large datasets is more desirable.

For example, it is beneficial to prioritize those next calculations of data abnormality in a dataset by prioritizing the calculations likely to complete faster. In a different implementation, future analytical calculations are prioritized based on how the results of previous calculations are scored. An analytical calculation similar to a previously executed calculation with high scoring results is also prioritized higher. In other words, the analytical calculation is assigned with the same priority score. The analytical calculation prioritization is further illustrated by reference to FIGS. 10A and 10B.

Referring to FIGS. 10A and 10B, two flowcharts depicting two processes by which a computer (such as the node 100) prioritizes analytical calculations are shown and generally indicated at 1000A and 1000B respectively. At 1002, a specialized software application running on the computer determines characteristics of a dataset. The characteristics include, for example, the number of records in the dataset and data types of columns of the records. At 1004, the software application determines a list of analytical calculations that may be executed on the dataset for determining any abnormality (such as errors, distorted data, data noise, etc.) in the dataset. At 1006, the software application prioritizes the list of analytical calculations based on the characteristics of a dataset and the characteristics of each analytical calculation in the list. For example, whether a calculation processes a dataset by performing only linear operations (such as comparisons) is a characteristic of the analytical calculation. As an additional example, whether a calculation processes a dataset by performing square root operations is a characteristic of the analytical calculation. Some characteristics deem the execution of a calculation on a dataset to be slower while others are faster. The prioritization associates a rank with each analytical calculation. At 1008, the software application selects the highest ranked analytical calculation from the prioritized list of analytical calculations. At 1010, the software application executes the selected analytical calculation on the dataset.

Referring now to FIG. 10B, at 1062, the software application executes each analytical calculation within a list of analytical calculations on a particular dataset. The list of analytical calculations includes one or more calculations. At 1064, the software application determines a result score of the execution of each analytical calculation on the dataset. At 1066, the software application ranks the list based on the scores. At 1068, the software application determines than an unlisted analytical calculation (meaning an analytical calculation that is not in the list) is similar to a listed analytical calculation (meaning a particular analytical calculation within the list). For example, the similarity is based on similar characteristics of the two analytical calculations. At 1070, the software application associates the rank of the listed analytical calculation with the unlisted analytical calculation.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for execution by a computer of a database management system, the method comprising:
    obtaining a dataset that includes a set of data records, wherein the data set is associated with a set of data characteristics;
    selecting a ranked analytical calculation of a ranked list of analytical calculations that are able to be executed on the dataset, wherein a list of analytical calculations are ranked based on the set of data characteristics and a set of analytical calculation characteristics associated with the list of analytical calculations to produce the ranked list of analytical calculations, and wherein an analytical calculation characteristic of the set of analytical calculation characteristics indicates an estimated execution time to perform the analytical calculation; and
    executing the selected ranked analytical calculation on the dataset to produce an analytical calculation result.

2. The method of claim 1, wherein a data characteristic of the set of data characteristics further indicates a number of data records within the dataset.

3. The method of claim 1, wherein a data characteristic of the set of data characteristics further indicates a data type of a column of each data record within the dataset.

4. The method of claim 1, wherein the analytical calculation result indicates an abnormality of data records within the dataset.

5. The method of claim 4, wherein the abnormality is one of:
    an error;
    data distortion; and
    data noise.

6. The method of claim 1 further comprises:
    determining to perform another analytical calculation on the dataset, wherein the other analytical calculation is not included in the ranked list of analytical calculations;
    determining another analytical calculation characteristic for the other analytical calculation;
    comparing the other analytical calculation characteristic to the set of analytical calculation characteristics; and
    when the other analytical calculation characteristic matches a first analytical calculation characteristic of the set of analytical calculation characteristics:
        determining the ranking of the analytical calculation associated with the first analytical calculation characteristic;
        assigning the ranking of the analytical calculation to the other analytical calculation; and
        executing the other analytical calculation on the dataset in accordance with the ranked list of analytical calculations.

7. The method of claim 1 further comprises:
    executing each ranked analytical calculation within the ranked list of analytical calculations on the dataset to produce a list of result scores, wherein the list of result scores includes a result score for each ranked analytical calculation.

8. The method of claim 7 further comprises:
    updating the ranking of the ranked list of analytical calculations based on the list of result scores.

9. The method of claim 1, wherein the analytical calculation characteristic further includes:
    a type of calculation to be performed by the ranked analytical calculation, wherein the type of calculation includes one or more of a linear operation and a square root operation.

10. The method of claim 1, wherein the dataset includes a data confidence value.

11. The method of claim 1, wherein the analytical calculation characteristic indicates an estimated execution time to perform the ranked analytical calculation.

12. A database management system that includes:
    a memory; and
    a computer that performs operations that include:
        obtaining a dataset that includes a set of data records, wherein the data set is associated with a set of data characteristics;
        selecting a ranked analytical calculation of a ranked list of analytical calculations that are able to be executed on the dataset, wherein a list of analytical calculations are ranked based on the set of data characteristics and a set of analytical calculation characteristics associated with the list of analytical calculations to produce the ranked list of analytical calculations, and wherein an analytical calculation characteristic of the set of analytical calculation characteristics indicates an estimated execution time to perform the analytical calculation; and
        executing the selected ranked analytical calculation on the dataset to produce an analytical calculation result.

13. The database management system of claim 12, wherein a data characteristic of the set of data characteristics further indicates a number of data records within the dataset.

14. The database management system of claim 12, wherein a data characteristic of the set of data characteristics further indicates a data type of a column of each data record within the dataset.

15. The database management system of claim 12, wherein the analytical calculation result indicates an abnormality of data records within the dataset.

16. The database management system of claim 15, wherein the abnormality is one of:
    an error;
    data distortion; and
    data noise.

17. The database management system of claim 12, wherein the operations further include:
    determining to perform another analytical calculation on the dataset, wherein the other analytical calculation is not included in the ranked list of analytical calculations;
    determining another analytical calculation characteristic for the other analytical calculation;
    comparing the other analytical calculation characteristic to the set of analytical calculation characteristics; and
    when the other analytical calculation characteristic matches a first analytical calculation characteristic of the set of analytical calculation characteristics:
        determining the ranking of the analytical calculation associated with the first analytical calculation characteristic;
        assigning the ranking of the analytical calculation to the other analytical calculation; and
        executing the other analytical calculation on the dataset in accordance with the ranked list of analytical calculations.

18. The database management system of claim 12, wherein the operations further include:
    executing each ranked analytical calculation within the ranked list of analytical calculations on the dataset to produce a list of result scores, wherein the list of result scores includes a result score for each ranked analytical calculation.

19. The database management system of claim 18, wherein the operations further include:
  updating the ranking of the ranked list of analytical calculations based on the list of result scores.

20. The database management system of claim 12, wherein the analytical calculation characteristic further includes:
  a type of calculation to be performed by the ranked analytical calculation, wherein the type of calculation includes one or more of a linear operation and a square root operation.

* * * * *